US011467038B2

(12) United States Patent
Kwon et al.

(10) Patent No.: US 11,467,038 B2
(45) Date of Patent: Oct. 11, 2022

(54) TIME AND TEMPERATURE INDICATION MODULE AND MANUFACTURING METHOD THEREFOR

(71) Applicant: TTI CO., LTD., Suwon-si (KR)

(72) Inventors: Bong-Soo Kwon, Gunpo-si (KR); Ji-Hoon Park, Suwon-si (KR); Young-Suk Jeon, Seoul (KR); Guan-O Lee, Hwaseong-si (KR); Byeong-Han Lim, Anyang-si (KR); Jin-Hee Jung, Suwon-si (KR); Cheong-Hoon Cho, Suwon-si (KR)

(73) Assignee: TTI CO., LTD., Suwon-si (KR)

( * ) Notice: Subject to any disclaimer, the term of this patent is extended or adjusted under 35 U.S.C. 154(b) by 1111 days.

(21) Appl. No.: 16/047,780

(22) Filed: Jul. 27, 2018

(65) Prior Publication Data

US 2018/0372549 A1    Dec. 27, 2018

Related U.S. Application Data

(63) Continuation of application No. PCT/KR2017/000350, filed on Jan. 11, 2017.

(30) Foreign Application Priority Data

Jan. 29, 2016    (KR) .......................... 10-2016-0011332

(51) Int. Cl.
*G01K 1/02* (2021.01)
*G01K 5/02* (2006.01)
(Continued)

(52) U.S. Cl.
CPC .................. *G01K 1/02* (2013.01); *G01K 3/04* (2013.01); *G01K 5/02* (2013.01); *G01K 5/32* (2013.01);
(Continued)

(58) Field of Classification Search
CPC .. G01K 1/02; G01K 3/04; G01K 5/02; G01K 5/32; G01K 11/06; G01K 11/16; G01K 2207/04
See application file for complete search history.

(56) References Cited

U.S. PATENT DOCUMENTS 3,615,719 A * 10/1971 Michel .................... A23B 4/06
374/E11.006
3,768,976 A * 10/1973 Hu .......................... G09F 3/0291
422/402

(Continued)

FOREIGN PATENT DOCUMENTS

KR    10-2014-0126547 A    10/2014
KR    10-2014-0126551 A    10/2014
(Continued)

OTHER PUBLICATIONS

International Search Report issued in PCT/KR2017/000350; dated Apr. 13, 2017.
(Continued)

*Primary Examiner* — Nimeshkumar D Patel
*Assistant Examiner* — Tania Courson
(74) *Attorney, Agent, or Firm* — Studebaker & Brackett PC (57) ABSTRACT

The present invention relates to the time-temperature indicating module which allows the user to trigger the bursting of the starting member with a simple motion and generate a crack so that the spread material interposed inside spreads via the crack. The present invention also relates to the manufacturing method of the time-temperature indicating module that strengthens a sealed section of the time-temperature indicating module using laminating by heat sealing to prevent the spread material from leaking or flowing out.

12 Claims, 9 Drawing Sheets

(51) Int. Cl.
  *G01K 5/32* (2006.01)
  *G01K 11/06* (2006.01)
  *G01K 11/16* (2021.01)
  *G01K 3/04* (2006.01)
(52) U.S. Cl.
  CPC .............. *G01K 11/06* (2013.01); *G01K 11/16* (2013.01); *G01K 2207/04* (2013.01)

(56) References Cited

U.S. PATENT DOCUMENTS

| | | | | |
|---|---|---|---|---|
| 6,042,264 | A * | 3/2000 | Prusik | G01K 3/04 374/150 |
| 6,741,523 | B1 * | 5/2004 | Bommarito | G01K 3/04 374/102 |
| 7,232,253 | B2 * | 6/2007 | Isbitsky | G01K 3/04 374/102 |
| 7,517,146 | B2 * | 4/2009 | Smith | G01K 11/06 374/102 |
| 7,682,830 | B2 * | 3/2010 | Prusik | G01N 31/229 374/162 |
| 7,891,310 | B2 * | 2/2011 | Taylor | G01K 11/06 374/106 |
| 8,061,294 | B2 * | 11/2011 | Suda | G01K 11/06 374/106 |
| 8,701,587 | B2 * | 4/2014 | Park | G01K 11/06 374/102 |
| 8,707,887 | B2 * | 4/2014 | Suda | G01K 11/06 374/162 |
| 9,127,990 | B2 * | 9/2015 | Rabinowitz | G01K 11/06 |
| 9,234,806 | B2 * | 1/2016 | Park | G01K 3/04 |
| 9,310,258 | B2 * | 4/2016 | Selman | G01K 3/04 |
| 9,348,318 | B2 | 5/2016 | Hong et al. | |
| 9,404,808 | B2 | 8/2016 | Park et al. | |
| 9,410,852 | B2 * | 8/2016 | Park | G01K 11/06 |
| 9,546,911 | B2 * | 1/2017 | Huffman | G01K 1/02 |
| 10,451,595 | B2 * | 10/2019 | Patel | G07C 1/00 |
| 10,514,340 | B2 * | 12/2019 | Prusik | G01K 3/04 |
| 11,241,902 | B1 * | 2/2022 | Smith | B42D 25/378 |
| 2004/0240324 | A1 * | 12/2004 | Isbitsky | G01K 3/04 368/327 |
| 2008/0110391 | A1 * | 5/2008 | Taylor | G01K 3/04 374/E11.006 |
| 2013/0220209 | A1 * | 8/2013 | Rabinowitz | G01K 11/06 116/216 |
| 2013/0239874 | A1 * | 9/2013 | Smith | G01N 31/229 156/60 |
| 2013/0305980 | A1 * | 11/2013 | Park | G01K 11/12 493/379 |

FOREIGN PATENT DOCUMENTS

| | | |
|---|---|---|
| KR | 10-2014-0129598 A | 11/2014 |
| KR | 10-2014-0129603 A | 11/2014 |
| KR | 10-2015-0051294 A | 5/2015 |

OTHER PUBLICATIONS

Written Opinion issued in PCT/KR2017/000350; dated Apr. 13, 2017.

An Office Action; mailed by the Korean Intellectual Property Office dated Feb. 16, 2017, which corresponds to Korean Patent Application No. 10-2016-0011332.

* cited by examiner

TIME AND TEMPERATURE INDICATION MODULE AND MANUFACTURING METHOD THEREFOR

CROSS-REFERENCE TO RELATED APPLICATIONS

The present application is a continuation of International Patent Application No. PCT/KR2017/000350, filed on Jan. 11, 2017, which claims a benefit of priority to Korean Patent Application No. 10-2016-0011332, filed on Jan. 29, 2016, the entire contents of which are incorporated herein by reference.

AREA OF THE TECHNOLOGY

The present invention relates to the time-temperature indicating module and manufacturing method thereof.

The time-temperature indicating module is provided for goods which need to be stored at a specific temperature and allows the exposure time to a specific temperature to be observed from the exterior.

BACKGROUND OF THE INVENTION

The cold storage and refrigeration industry has been advancing rapidly recently. Accordingly, products that need to be stored at a specific temperature such as foods, medicine, medical supplies, and cosmetic products are being developed and used.

Products that are heated, sterilized and stored in sealed metal cans such as canned goods can be preserved for a long time, and are exceptions. However, the types of applicable products are limited because they must be heated and sterilized.

On the other hand, these products have different shelf lives and require different environments (e.g. direct sunlight, optimal storage temperature, humidity) during the distribution process until they are delivered to end-consumers.

In particular, food, medicine and medical supplies must be stored within a specific temperature range so that they stay fresh throughout the distribution process. As for medicine and medical supplies, if they are exposed to a different temperature for a certain period of time, the ingredients may go bad and cause serious medical side effects. In the case of food, if food is stored at a higher-than-recommended temperature for a long time, contents may go bad and cause illnesses such as food poisoning.

Therefore, it is very important that consumers be able to readily verify the distribution process.

However, it is very difficult for end-consumers to verify whether a product was stored at the recommended temperature. End-consumers can only tell that a product was not properly refrigerated or kept frozen when the color, smell, or flavor of the product has changed. Even those who manage frozen and refrigerated foods cannot easily verify with the naked eye whether a product was properly stored at the specified temperature.

Therefore, many methods and apparatus have been introduced to allow consumers to tell if such products were stored and distributed at the specified temperature. Major global companies such as 3M have been using Time Temperature Indicators (TTI), which are time-temperature indicating modules. These modules are labels attached on the product to display time-temperature records. Today, various types of TTI are being developed and used.

However, the existing time-temperature indicating modules require physical action or "activation" to allow the spread material, which is interposed inside, to come into contact with the spread medium. Activation for these existing time-temperature indicating modules is very inconvenient as the user must to use a special tool to apply pressure to and break the gelatin that covers the spread material.

Additionally, in the case of the existing time-temperature indicating modules, the spread material—fatty acid ester—must be covered with gelatin or other covering materials, which requires more space and increases the volume.

Furthermore, the liquid sealing method is used when the spread material is filled between fabrics in the current manufacturing process of time-temperature indicating modules. This method is used to interpose a viscid liquid between two fabrics. The spread material is injected into the inside of the pipe-shaped fabric to fill it and then both ends are sealed and cut with heat.

However, the liquid sealing method has some drawbacks. The spread material injected into the space between two fabrics undermines the effects of heat sealing and weakens the sealed section. As a result, the spread material may leak or flow out through the weakened sealed section, contaminating the surroundings.

Accordingly, the present inventor invented a time-temperature indicating module that allows the user to trigger the bursting of the starting member with a simple motion to generate a crack so that the spread material interposed inside spreads via the crack. The present inventor also invented the manufacturing method of the time-temperature indicating module, which strengthens the sealed section of the module using lamination by heat sealing to prevent the spread material from leaking or flowing out, in order to resolve problems associated with the existing time-temperature indicating module and manufacturing technologies thereof.

DETAILED DESCRIPTION OF THE INVENTION

Technical Challenge

Various aspects of the present invention are designed to provide a time-temperature indicating module that allows the user to trigger the bursting of the starting member with a simple motion to generate a crack so that the spread material interposed inside spreads via the crack. In addition, they are also designed to provide a manufacturing method of the time-temperature indicating module which strengthens the sealed section of the time-temperature indicating module using lamination by heat sealing to prevent the spread material from leaking or flowing out.

Technical Solution

According to an exemplary embodiment of the present invention, the time-temperature indicating module can include: the spread materials interposing layer, where the spread material melts when the temperature changes; the spread medium layer provided above the spread materials interposing layer and absorbs the spread material to allow it to disperse; the indicating layer provided above the spread medium layer, which enables the user to see from the exterior whether the spread medium is spread or not; and the starting member provided on the inside of the spread materials interposing layer, which enables the spread material and spread medium layer to come into contact via a crack generated by external pressure.

According to an exemplary embodiment, the spread materials interposing layer can include: the first interposed layer where a hole is formed; the second interposed layer laminated along the edge of the bottom surface of the first interposed layer; and the section containing the spread material, which is provided between the first and the second interposed layers and filled with the spread material.

According to an exemplary embodiment, the time-temperature indicating module has a feature where the spread material flows through the hole into the spread medium layer.

According to an exemplary embodiment, each of the first and the second spread materials can be made of a laminated spread material interposing film, which is at least one of the following materials: polyethylene terephthalate (PET), polypropylene (PP), polyethylene (PE), and nylon (NY).

According to an exemplary embodiment, the spread material interposing film provided on the lowest side and the spread material interposing film provided on the top side can be made of heat sealable materials.

According to an exemplary embodiment, a surface treatment can be applied to the bottom surface of the first spread materials interposing layer, using a corona discharge that is higher than a specific dyne level.

According to an exemplary embodiment, one or more spread lines can be printed on the side of the first spread materials interposing layer to indicate how much spread material is dispersed along the layer.

According to an exemplary embodiment, the starting member can be bonded in line with the hole in the bottom of the first spread materials interposing layer in order to cover the hole. Also, when external pressure is applied, the spread material flows into the spread medium thorough the crack generated in the hole, initiating contact.

According to an exemplary embodiment, the starting member can be a type of synthetic resin, which includes a crystalline compound that at minimum contains either a calcium carbonate powder or titanium dioxide.

According to an exemplary embodiment, the time-temperature indicating module can further include a printed protective member to cover the exterior of the starting member.

According to an exemplary embodiment, the spread medium layer can be a type of micro-porous film.

According to an exemplary embodiment, the indicating layer can include a display window located in line with the spread line and one or more spread lines may gradually penetrate into the display window with the dispersion of the spread material, becoming visible from the exterior.

According to an exemplary embodiment, the display window can be a transparent area and the other sections excluding the display window can be an opaque printing area.

According to an exemplary embodiment, the indicating layer can be made of a laminated synthetic resin film, which is at least one of the following materials: polyethylene terephthalate (PET), polypropylene (PP), polyethylene (PE), and nylon (NY).

According to an exemplary embodiment, the spread materials interposing layer can also be laminated further with an anti-leakage film that prevents the spread material from flowing out via the bottom of the spread materials interposing layer.

According to an exemplary embodiment, the spread material can be fatty acid esters.

According to another exemplary embodiment, the manufacturing method of the time-temperature indicating module can include the following steps of: providing the spread materials interposing layer; providing the starting member; providing the spread medium layer; providing the indicating layer; and interposing the spread material—which melts when the temperature changes—inside the spread materials interposing layer.

According to an exemplary embodiment, the step of providing the spread materials interposing layer can include the step of making the first spread materials interposing layer and the step of making the second spread materials interposing layer. The first and the second spread materials interposing layers are made by laminating at least one of the following materials: polyethylene terephthalate (PET), polypropylene (PP), polyethylene (PE), and nylon (NY).

According to an exemplary embodiment, the step of making the first spread materials interposing layer can include at least one of the following: the step of surface treatment using a corona discharge that is higher than a specific dyne level; the step of forming a hole in the first spread materials interposing layer; the step of printing one or more spread lines—which indicate how much spread material is spread along the layer—on the side of the first spread materials interposing layer.

According to an exemplary embodiment, the step of providing the starting member can include: the step of making the starting member using synthetic resins that contain at minimum either a calcium carbonate powder or titanium dioxide; the step of binding the starting member in line with the hole in the bottom of the first spread materials interposing layer so that it covers the hole; and the step of printing a protective member to cover the exterior of the starting member.

According to an exemplary embodiment, the step of providing the spread medium layer may include the step of locating the spread medium—which is a type of microporous film—on the interposing layer and laminating them together.

According to an exemplary embodiment, the step of providing the indicating layer may include the following steps: the step of making the indicating layer by laminating synthetic resin films, each of which is at least one of the following materials: polyethylene terephthalate (PET), polypropylene (PP), polyethylene (PE), nylon (NY); and the step of providing a display window a specific distance away from the hole, in the direction of the material dispersion, on the side of the indicating layer.

According to an exemplary embodiment, the step of making the indicating layer may include the step of applying opaque printing on the other sections, with the exception of the display window.

According to an exemplary embodiment, the step of interposing the spread material can include the following: the step of making a spread material containing section by laminating the first spread materials interposing layer and the second spread materials interposing layer by applying pressure and heat sealing, vertical to the direction of providing the first and the second spread materials interposing layers, to the bottom of the first spread materials interposing layer and the first areas of the upper part of the second spread materials interposing layer, which is provided as stated earlier; the step of injecting the spread material into the interior of the containing section to fill it up; the step of sealing the contained spread material by applying pressure and heat sealing, vertical to the direction of providing the second spread materials interposing layer, to the second area of the first and the second spread materials interposing layers; and the step of cooling down the first spread materials interposing layer and the second spread materials interposing layer, which are heat-sealed as described above.

According to an exemplary embodiment, the step of making the second spread materials interposing layer can include the step of laminating anti-leakage film onto the bottom of the spread materials interposing layer to prevent the spread material from flowing out from the spread materials interposing layer to the exterior.

Effect of the Invention

The present invention allows the user to trigger the bursting of the starting member with a simple motion to generate a crack, so that the spread material interposed inside disperses via the crack. Therefore, the present invention has advantages in that a special tool, such as an activation apparatus, is not required—unlike existing methods—to apply pressure to the gelatin that covers the spread.

Additionally, in the present invention, the spread material doesn't need to be covered with gelatin or other materials and the spread material can be injected between two fabrics that are laminated by heat sealing. Therefore, the present invention does not create unnecessary space, thereby minimizing the volume.

Also, a synthetic resin film that is strongly sealed by heat sealing is applied when the spread material is interposed, preventing the spread material from leaking or flowing out via the sealed section to the exterior. Therefore, the present invention has advantages in that the spread material does not contaminate the exterior of the time-temperature indicating module.

DETAILED DESCRIPTION OF THE INVENTION

The present invention can be more readily understood by reference to the following detailed description of embodiments. However, these embodiments are only provided so that the present invention can be more easily understood. Therefore, the content of the present invention should not be construed as being limited to the embodiments set forth herein.

Figure 1:
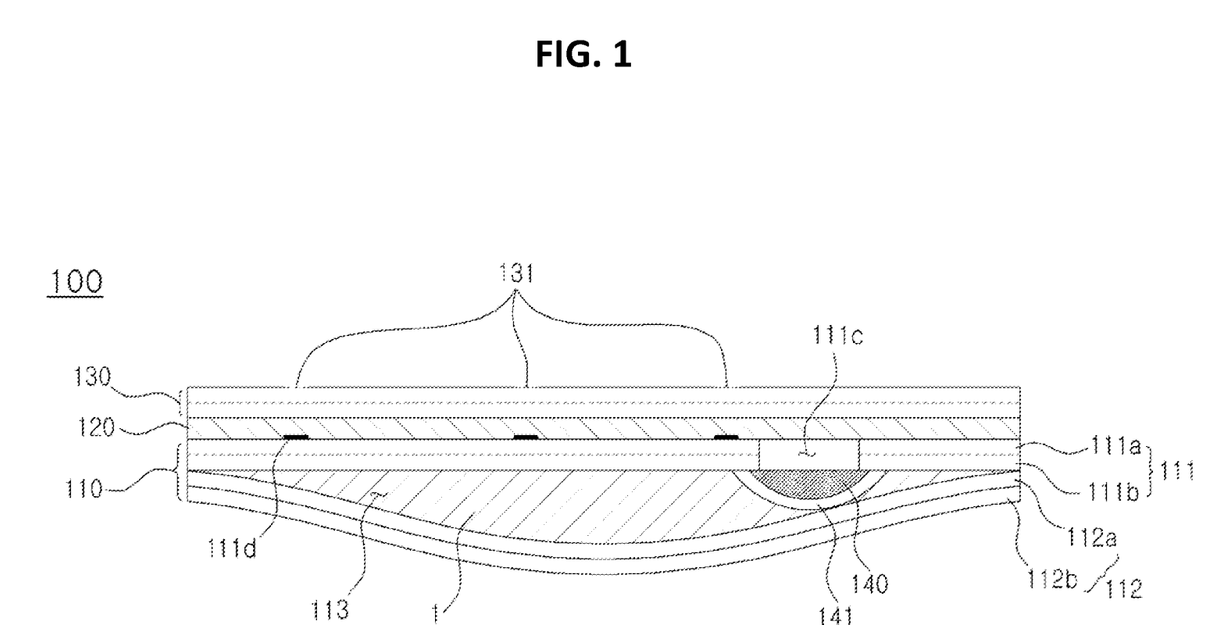
FIG. 1 is an exemplary drawing illustrating the structure of the time-temperature indicating module (100) according to an exemplary embodiment of the present invention.

FIG. 1 is an exemplary drawing illustrating the form of the time-temperature indicating module (100) according to an exemplary embodiment of the present invention.

In FIG. 1, the time-temperature indicating module (100) can include the spread medium layer (120), indicating layer (130), and starting member (140).

First, the spread materials interposing layer (110) can interpose the spread material (1) on the inside; the spread material melts when the temperature changes.

The spread material (1) can be chemicals such as fatty acid esters which melt at a specific temperature, the melting point. The spread material (1) used herein can be understood as a general term for all kinds of chemicals that can melt at a specific temperature and be absorbed and dispersed through the spread medium layer (120).

In addition, the phrase 'interpose the spread material (1) inside' used herein can be understood as the state in which the spread materials interposing layer (110) is filled by charging it with or injecting the spread material (1) into the inside of the spread materials interposing layer (110). Verbs such as 'charge', 'inject', 'fill' and variations such as 'charges', 'charged', 'injects', 'injected', 'fills', or 'filled' can be understood to imply the same meaning.

The spread materials interposing layer (110) which interposes the spread material (1) inside is described below in more detail, in FIGS. 2 to 4.

Figure 2A:
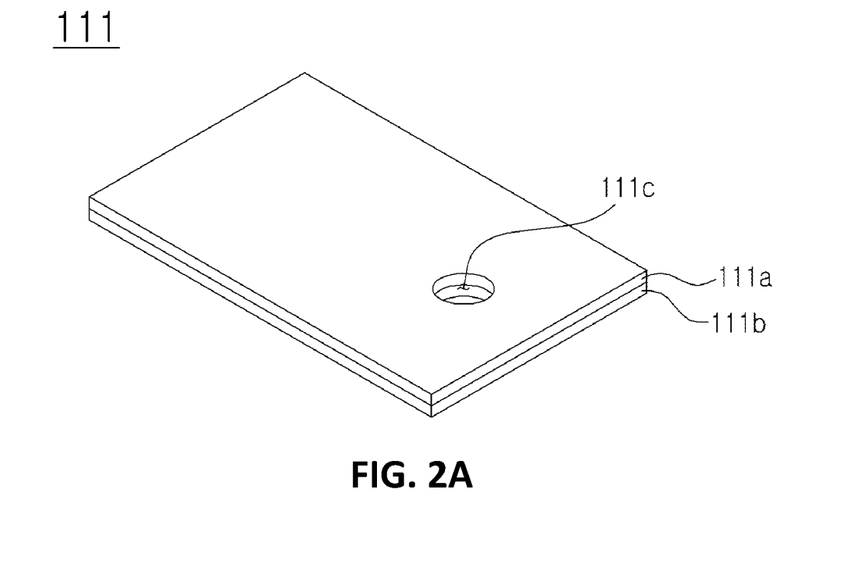
FIGS. 2A and 2B are exemplary drawings illustrating the structure of the spread materials interposing layer (110), which is illustrated in FIG. 1, according to an exemplary embodiment of the present invention.
Figure 2B:
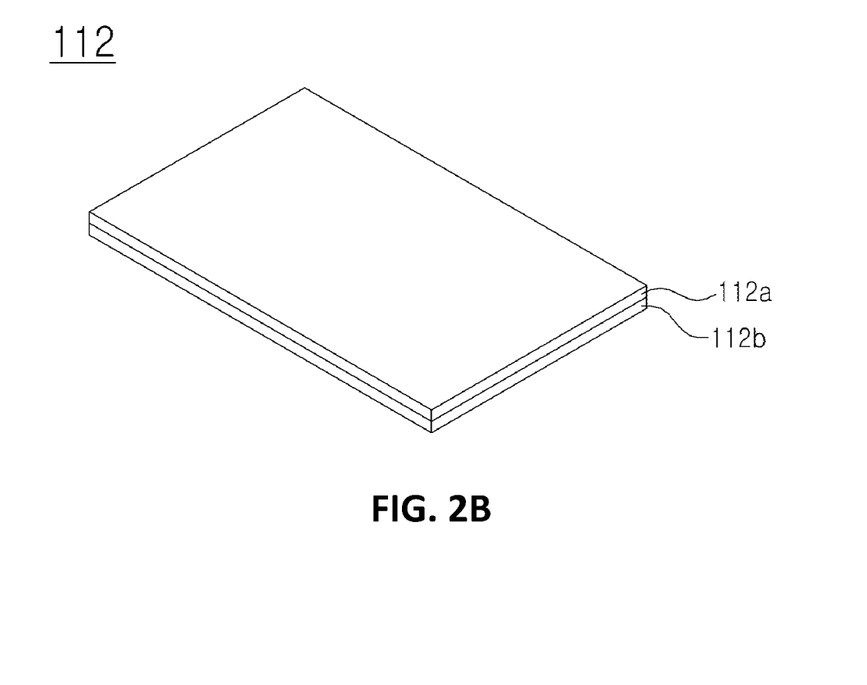

FIGS. 2A and 2B are exemplary drawings illustrating the structure of the spread materials interposing layer (110), which is illustrated in FIG. 1, according to an exemplary embodiment of the present invention. FIGS. 3A and 3B are exemplary drawings illustrating the structure of the first spread materials interposing layer (111) that has been surface treated using a corona discharge, according to an exemplary embodiment of the present invention. FIG. 4 is an exemplary drawing illustrating the laminating of the first spread materials interposing layer (111)—which is illustrated in FIG. 1—with the spread medium layer (120a), according to an exemplary embodiment of the present invention.

FIG. 2A is a drawing illustrating the first spread materials interposing layer (111) which is the upper side of the spread materials interposing layer (110). FIG. 2B is a drawing illustrating the second spread materials interposing layer (112) which is the bottom surface of spread materials interposing layer (110).

Each of the first and the second spread materials interposing layers (111, 112) can be made of multiple laminated spread material interposing films, which should be at minimum one of the following materials: polyethylene terephthalate (PET), polypropylene (PP), polyethylene (PE), and nylon (NY).

As shown, the first spread materials interposed layer (111) is made by laminating two spread material interposing films—the first spread material interposing film (111a) and the second spread material interposing film (112a)—by heat sealing or bonding. The second spread materials interposed layer (112) is made by laminating two spread material interposing films—the third spread material interposing film (112a) and the fourth interposing film (114a)—by heat sealing or bonding. However, the number of the spread material interposing films to be laminated is not limited to two; it may be changed to three or four.

A hole (111c) that goes through the first spread materials interposed layer (111) can also be created. The spread material (1) on the interposed layer (110) can leak via the hole (111c) and come into contact with the spread medium layer (120); this will be described at a later segment.

There are no restrictions on the size of the hole (111c) as long as the size is suitable for the viscid spread material (1) to flow out. In addition, while the preference is that there be only one hole (111c) on the first spread materials interposed layer (111), in some cases, the first spread materials interposed layer (111) may have multiple holes on it.

The second spread material interposing film (111b), which is located on the bottom surface of the first spread materials interposed layer (111), and the third spread material interposing film (112a), which is located on the top side of the second spread materials interposed layer (112), may be partially laminated together along the edges. In such a case, the central parts are not laminated so that there is still space—that is, the section containing the spread material (113); the spread material (1) can be injected into this section containing the spread material (113) to fill it.

For this purpose, the second and the third spread material interposing films (111b, 112a) should be made with materials which can be solidly laminated together. The preferred choice for the second and the third spread material interposing films (111b, 112a) would be polypropylene (PP). Parts of the edges of the second and the third spread material interposing films (111b, 112a) can be solidly laminated together by heat sealing, forming the 'sealed section'.

The word "laminated" used herein can be understood to mean 'sealed by heat', and an area laminated together can be understood to mean 'sealed section'.

There is no limit to the size of the section containing the spread material (113) created in the central part of a sealed section, as long as it can absorb a sufficient quantity of the spread material (1).

According to an exemplary embodiment of the invention, anti-leakage film (not shown) may be laminated via heat sealing or bonding with the bottom side of the fourth spread material interposing film (112b), which is located on the bottom surface of the second spread materials interposed layer (112).

Anti-leakage film can prevent the spread material (1) from leaking out when the spread material (1) that has been injected into the section containing the spread material (113) melts down by heat and flows out via the fourth spread material interposing film (112b). In this case, anti-leakage film can be a type of synthetic resin film such as nylon (NY).

The bottom surface of the first spread materials interposed layer (111) can be treated to strengthen adhesion of the starting member (140); this will be described in detail in reference to FIGS. 3A and 3B.

Figure 3A:
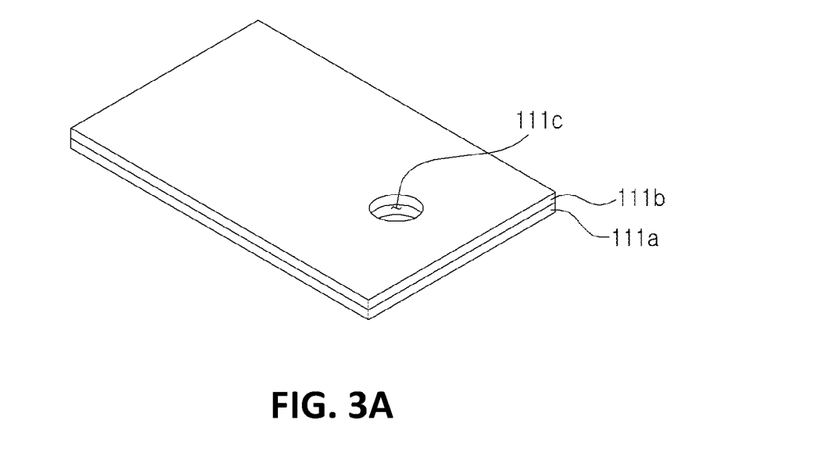
FIGS. 3A and 3B are exemplary drawings illustrating the structure of the first spread materials interposing layer (111) which has been surface treated using a corona discharge according to an exemplary embodiment of the present invention.

The second spread material interposing film (111b), which is the bottom surface of the first spread materials interposed layer (111), is illustrated upside down to face up in FIG. 3A.

In accordance, the first spread material interposing film (111a), which is the top side of the first spread materials interposed layer (111), is upside down as well to face down. The position of the hole (111c) remains the same.

Figure 3B:
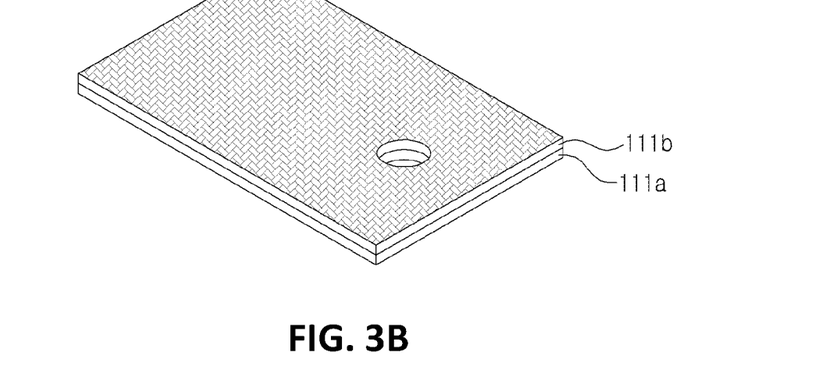

In FIG. 3B, one can see that the surface of the second spread material interposing film (111b) can be treated so that it becomes coarse in texture; for example, a corona discharge that is 36 or more dyne levels can be applied.

Since the surface treatment using corona discharge utilizes existing technology to strengthen the adhesiveness of ink, an in-depth description of the process will be omitted. The surface treatment using a corona discharge strengthens the adhesiveness of the starting member (140) so that the starting member (140) remains bonded to the second spread material interposing film (111b) and does not fall off during distribution of the time-temperature indicating module (100).

The process of binding the starting member (140) will be described in detail in the section on the starting member (140) and FIGS. 7A to 7C.

For the surface treatment using corona discharge, the dyne level is not restricted to 36, and can be changed depending on the starting member (140).

According to an exemplary embodiment, one or more spread lines (111d) which indicate how the spread material (1) disperses along the spread medium layer (120)—which will be described later—can be printed on one side of the spread materials interposed layer (111), for example, either the top or bottom surface. The one or more spread lines (111d) can be visible through the display window (131)—which will be described later—so that the user can see it. The one or more spread lines (111d) may be printed in a specific color, such as red, so that it is visible to the user. Since the spread medium layer (120), which will be described later, is opaque, the spread lines may not be visible until the spread medium (1) is absorbed by the spread medium layer (120), because the spread medium layer (12) may be naturally opaque. When spread medium layer (120) becomes transparent after the absorption of the spread medium (1), the spread line (111d) can be made clearly visible by using a specific color. The visibility of the spread line (111d) will be described in detail later in regard to FIGS. 4. to 6.

The spread medium layer (120) is located on top of the first spread materials interposed layer (111) and can absorb and disperse the spread material (1) that flows out from the hole (111c).

The spread medium layer (120), described above, can be a type of opaque micro-porous film and may be laminated by heat-sealing or via adhesive with the first spread materials interposed layer (111) which is described above, and the indicating layer (130), which will be described later.

The spread medium layer (120) may remain opaque before it makes contact with and absorbs the spread material (1); after this, the spread medium layer (120) will gradually become transparent, starting from the initial area of contact and expanding onwards.

Since the spread medium layer (120) can turn transparent starting from the area of contact with the spread material (1), printed spread lines (111d) will be clearly visible on the first spread materials interposed layer (111). The process in which the spread medium layer (120) gradually turns transparent will be described in more detail later in reference to FIGS. 5 and 6.

The indicating layer (130) can be located on top of the spread medium layer (120). When the spread medium layer (120) comes into contact with the spread material (1), and absorption/dispersion begins, the indicating layer (130) can make the dispersion of the spread material (1) visible from the exterior.

The indicating layer (130) can be printed to be overall opaque, but the top side of the indicating layer (130) can feature a transparent display window (131), so that the dispersion of the spread material (1) is visible from the exterior.

In such a case, the display window (131) can be located in line with the aforementioned spread line (111*d*) so when the spread material (1) is dispersed, one or more spread lines (111*d*) in specific colors can be made visible from the exterior through the display window (131). Here, the phrase 'one or more spread lines (111*d*)' means that one or more spread lines (111*d*) are printed from the hole (111*d*), and in such a case, there may be one or more display windows (131), or the display window (131) may be large enough to display all the spread lines (111*d*) at once.

The indicating layer (130) can be made by laminating multiple synthetic resin films via heat sealing or bonding. The synthetic resin films in question should be at minimum one of the following: polyethylene terephthalate (PET), polypropylene (PP), polyethylene (PE), and nylon (NY).

Therefore, the indicating layer (130) is capable of not only making the dispersion of the spread material (1) visible from the exterior, but also protects the spread medium layer (120) on the bottom surface and prevents the spread material (1) from flowing out externally.

An in-depth description of how the spread line (111*d*) is made visible through the indicating layer (130) will be provided later in regard to FIGS. 5 and 6.

The starting member (140) is provided inside the first and the second spread materials interposed layers (111, 112), more specifically, the bottom surface of the first spread materials interposed layer (111). The starting member (140) allows leakage of the spread material (1) by bursting from external pressure and creating a crack through which the spread material (1) in the section containing the spread material (113) can flow through the hole (111*c*) into the spread medium layer (120).

Figure 7A:
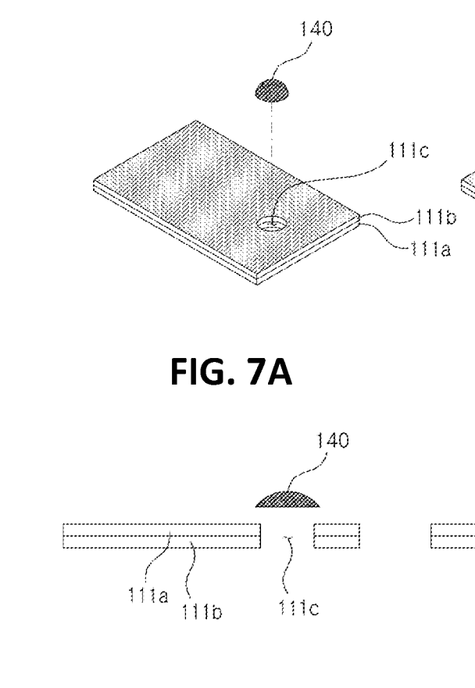
FIGS. 7A to 7C are exemplary drawings illustrating how the starting member (140) binds to the first spread materials interposing layer (111), which is illustrated in FIG. 1, according to an exemplary embodiment of the present invention.
Figures 7B, 7C:
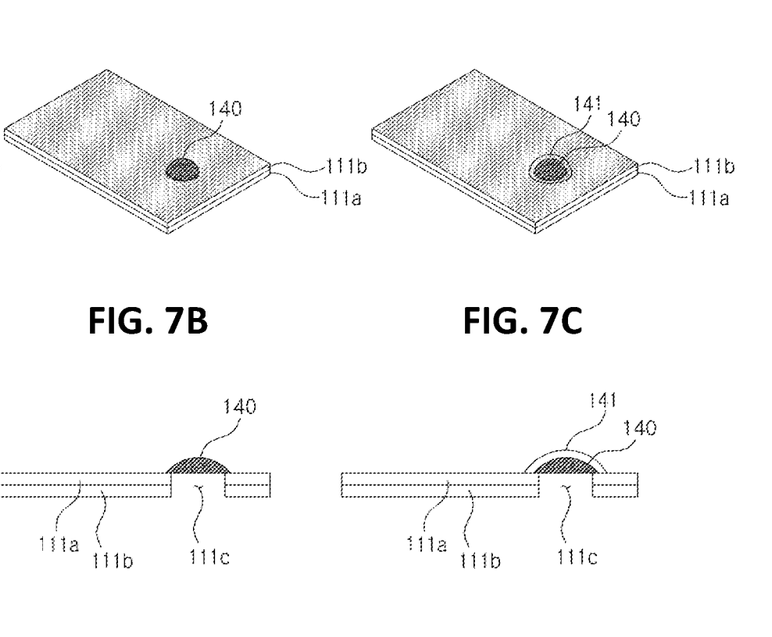

This starting member (140) will also be described in detail in reference to FIG. 7.

FIGS. 7A to 7C are exemplary drawings illustrating the how the starting member (140) binds to the first spread materials interposed layer (111) which is illustrated in FIG. 1.

Since the starting member (140) can be positioned in line with the hole (111*c*) and surface treatment using a corona discharge has been applied to the bottom surface of the first spread materials interposed layer (111), the starting member (140) can be easily bonded.

Since the starting member (140) should easily burst from external pressure—e.g. the user grabbing and twisting the time-temperature indicating module (100), snapping it—the starting member (140) may be a type of synthetic resin that is a mixture of printing ink resins and crystalline compound powders that range from 2 to 150 micrometers in particle size, such as a calcium carbonate powder or titanium dioxide. The starting member (140) can be printed and bonded on the bottom surface of the first spread materials interposed layer (111) so that the starting member (140) can cover the hole (111*c*); by printing the starting member (140) in intervals of 60 to 100 meshes, the starting member (140) can be made to easily burst from external pressure.

According to an exemplary embodiment, since the starting member (140) can burst easily, the protective member (141) can be printed to cover the exterior of the starting member (140).

The protective member (141) can be printed on the exterior of the starting member (140) and prevents the spread material (1) from being absorbed by the starting member (140), thereby preventing the starting member (140) from weakening; the resin ink can be printed in intervals of 150 to 600 mesh.

The process through which the starting member (140) bursts, creating a crack, will be described in further detail in reference to FIGS. 8A to 8E.

Figure 4:
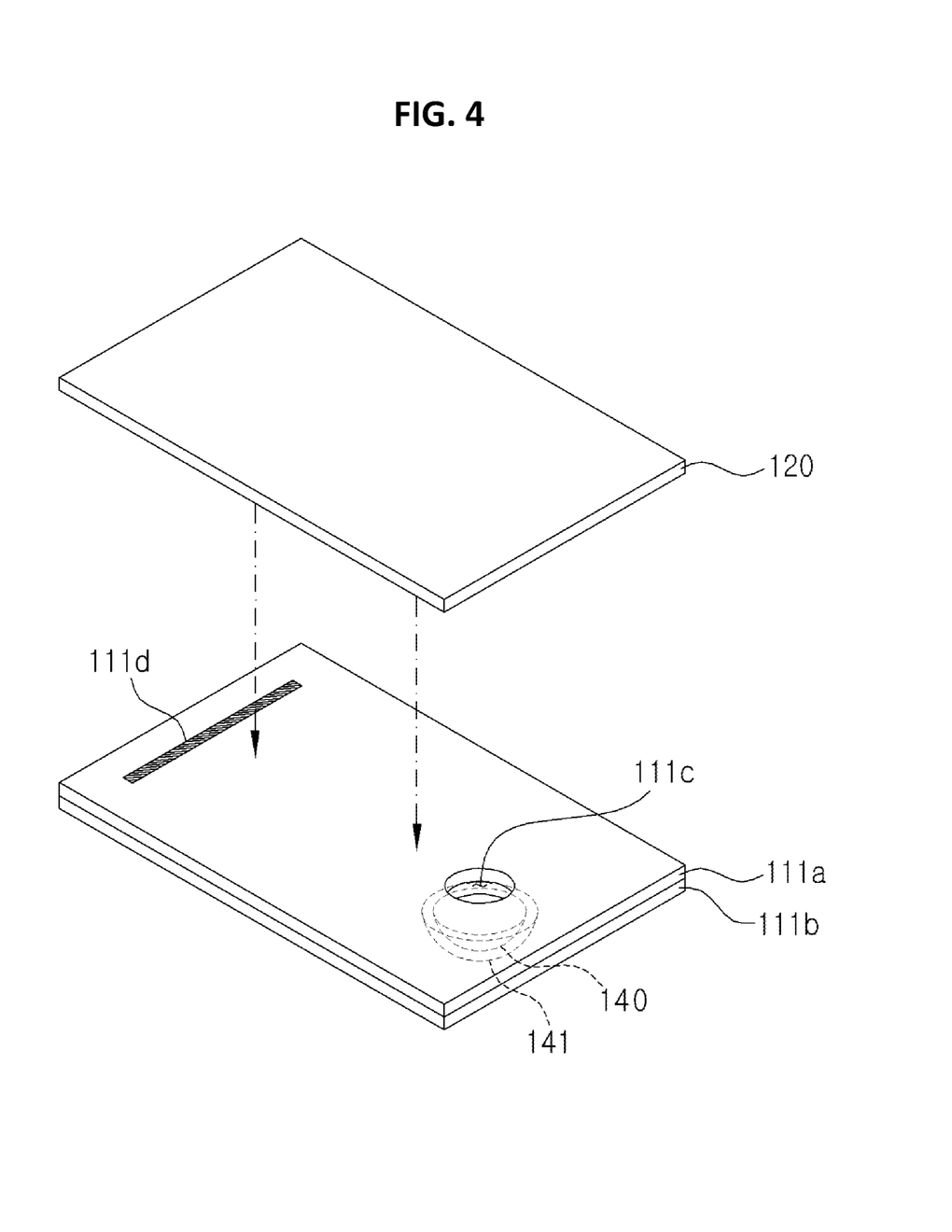
FIG. 4 is an exemplary drawing illustrating the laminating of the first spread materials interposing layer (111), which is illustrated in FIG. 1, with the spread medium layer (120a) according to an exemplary embodiment of the present invention.
Figure 5A:
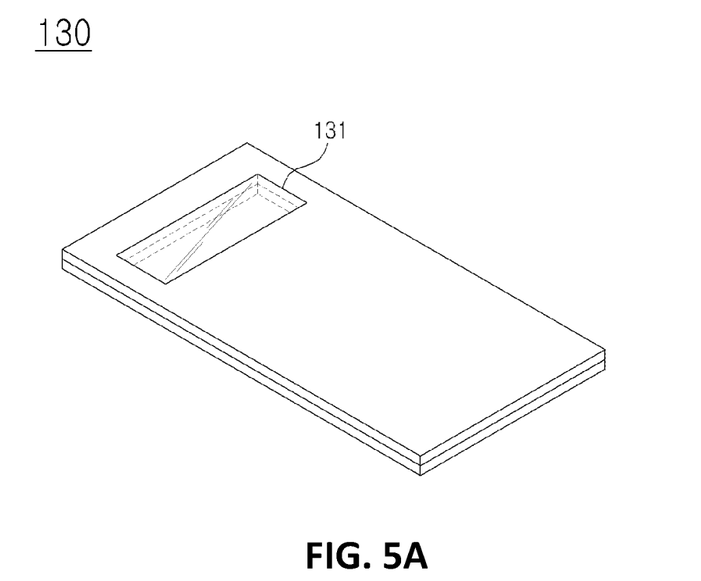
FIGS. 5A and 5B are exemplary drawings illustrating the indicating layer (130), which is illustrated in FIG. 1, according to an exemplary embodiment of the present invention.
Figure 5B:
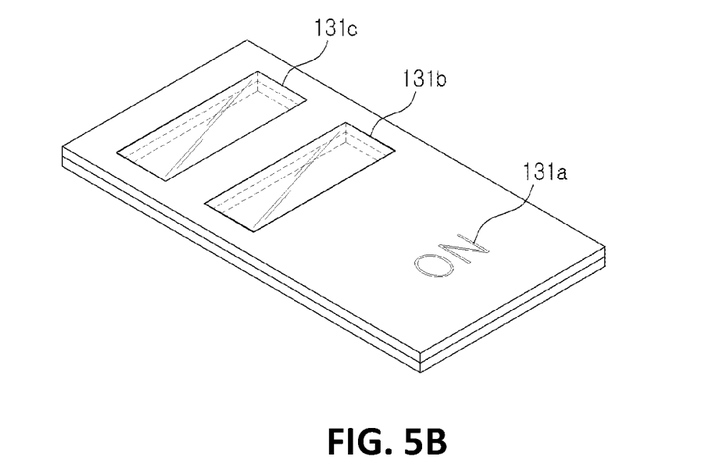
Figure 6A:
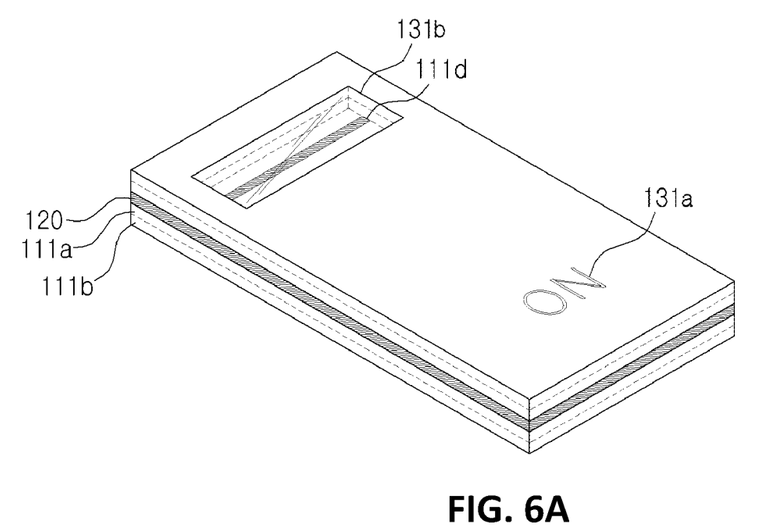
FIGS. 6A and 6B are exemplary drawings illustrating how the spread line (111d) is visible through the display window (131), which is illustrated in FIGS. 5A and 5B, according to an exemplary embodiment of the present invention.
Figure 6B:
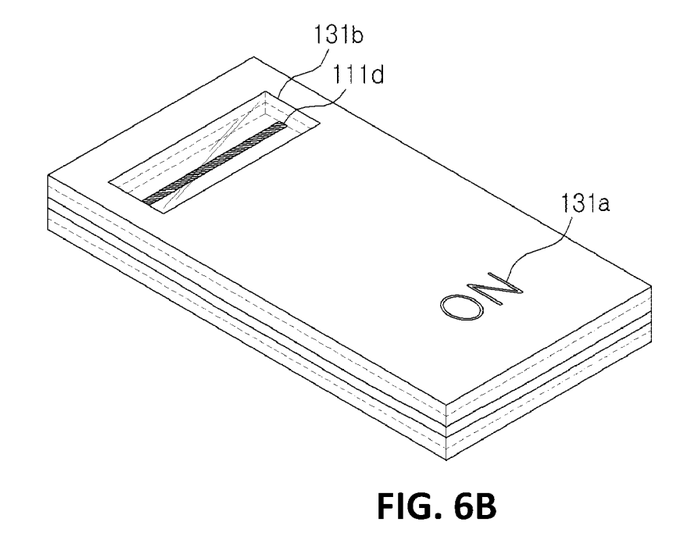

Next is a more detailed description of how the first spread materials interposed layer (111), spread medium layer (120), and indicating layer (130) are laminated, in regard to FIGS. 4 to 6.

FIG. 4 is an exemplary drawing illustrating the laminating of the first spread materials interposed layer (111) which is illustrated in FIG. 1, and the spread medium layer (120*a*). FIGS. 5A and 5B are exemplary drawings of the indicating layer (130) in FIG. 1. FIGS. 6A and 6B are drawings illustrating the visibility of the spread line (111*d*) through the display window (131) that is illustrated in FIGS. 5A and 5B.

In FIG. 4, the first spread materials interposed layer (111) is made by laminating the first and the second spread material interposing films (111*a*, 111*b*) and the bottom surface of the second spread material interposing film (111*b*) has rough casts made by surface treatment using corona discharge; the hole (111*c*) is blocked off by adhesive printing of the starting member (140) and the protective member (141).

One or more spread lines (111*d*) can be printed on the top side of the first spread material interposing film (111*a*) and the spread line (111*d*) can be printed at a specific distance from the hole (111*c*) so that there is room for the spread material (1) to disperse. The spread medium layer (120) can be located on top of the first spread material interposing film (111*a*) and laminated with it by heat sealing or bonding.

In FIG. 5A, multiple synthetic resin films are laminated together by heat sealing or bonding. The entire area is printed opaquely excluding the display window (131), which is transparent. The display window (131) is in line with the spread line (111*d*), which is illustrated in FIG. 4.

In FIG. 5B, display window (131) can be formed in multiples, e.g. the first display window (131*a*), the second display window (131*b*), and the third display window (131*c*). The first display window (131*a*) indicates the starting point of dispersion, which is the point of contact when the spread material (1) flows out via the hole (111*c*)—which is illustrated in FIG. 4—and makes contact with the spread medium layer (120). The second display window (131*b*) indicates a middle point as the spread medium (1) disperses. The third display window (131*c*) indicates the final completion point of dispersion.

In FIG. 6A, from the top down, the indicating layer (130), spread medium layer (120), and spread materials interposed layer (110) are laminated and the starting member (140) has not burst, so the spread material (1) has not spread to the medium layer (120) and the spread medium layer (120) remains opaque.

Since the spread line (111*d*) which is printed on the first spread material interposing film (111*a*) is covered by the opaque spread medium layer (120), the spread line in both the first and the second display windows (131*a*, 131*b*) are faint.

In FIG. 6B, the starting member (140) has burst, creating a crack, and as a result the spread material (1) was delivered to the spread medium layer (120), turning it transparent.

Consequently, the spread line (111d) printed on the first spread material interposing film (111a) is completely visible through the transparent spread medium layer (120) and both the first and the second display windows (131a, 131b) display a clearly visible spread line (111d).

In this case, the user can see that the spread material (1) made contact through the spread line (111d) shown on the first display window (131a). From the spread line (111d) visible through the second display window (131b), the user can see that the time-temperature indicating module (100) was not stored at the designated temperature range.

FIGS. 8A to 8E provide a more detailed understanding of how the dispersion of the spread material is initiated via user application of pressure on the time-temperature indicating module (100).

FIGS. 8A to 8E are exemplary drawings illustrating the order in which the dispersion of the spread material is initiated when a user applies pressure to the time-temperature indicating module (100).

Figure 8A:
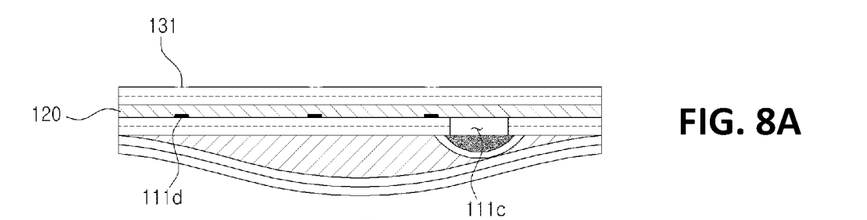
FIGS. 8A to 8E are exemplary drawings illustrating how the user applies pressure to the time-temperature indicating module (100), thereby initiating the dispersion of the spread material, according to an exemplary embodiment of the present invention.
Figure 8B:
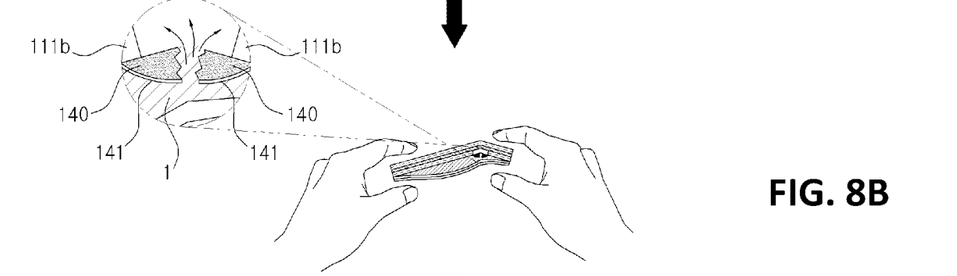

When the user applies pressure to the time-temperature indicating module (100) by grabbing and snapping it, as described in FIG. 8B, the starting member (140) and the protective member (141) covering the starting member burst, creating a crack. This causes the spread material (1) in the section containing the spread material (113) to flow out via the hole (111c), making contact with the spread medium layer (120). In this condition, the time-temperature indicating module (100) can be placed on a product that should be stored at a certain stable temperature during distribution—such as food and medicine—so that the end-user can see whether the product remained at the desired temperature by checking how much the spread material (1) dispersed over the time.

Figure 8C:
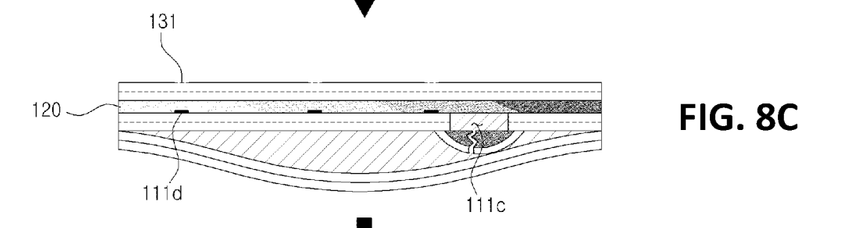
Figure 8D:
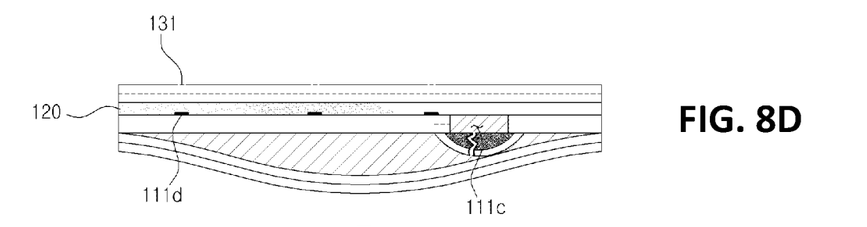
Figure 8E:
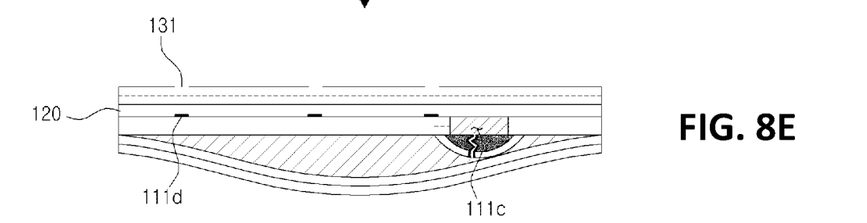

As described in FIGS. 8C to 8E, if the spread material (1) continued to disperse because the temperature was not successfully maintained, the spread medium layer (120) gradually turns transparent, starting from the area surrounding the hole (111c).

Accordingly, the spread medium layer (120) turns completely transparent, as seen in FIG. 8E, making the spread line (111d) printed on the first spread material interposing film (111) clearly visible from the exterior.

In this case, the end-consumer can see that the product was stored without proper temperature management during distribution.

Figure 9:
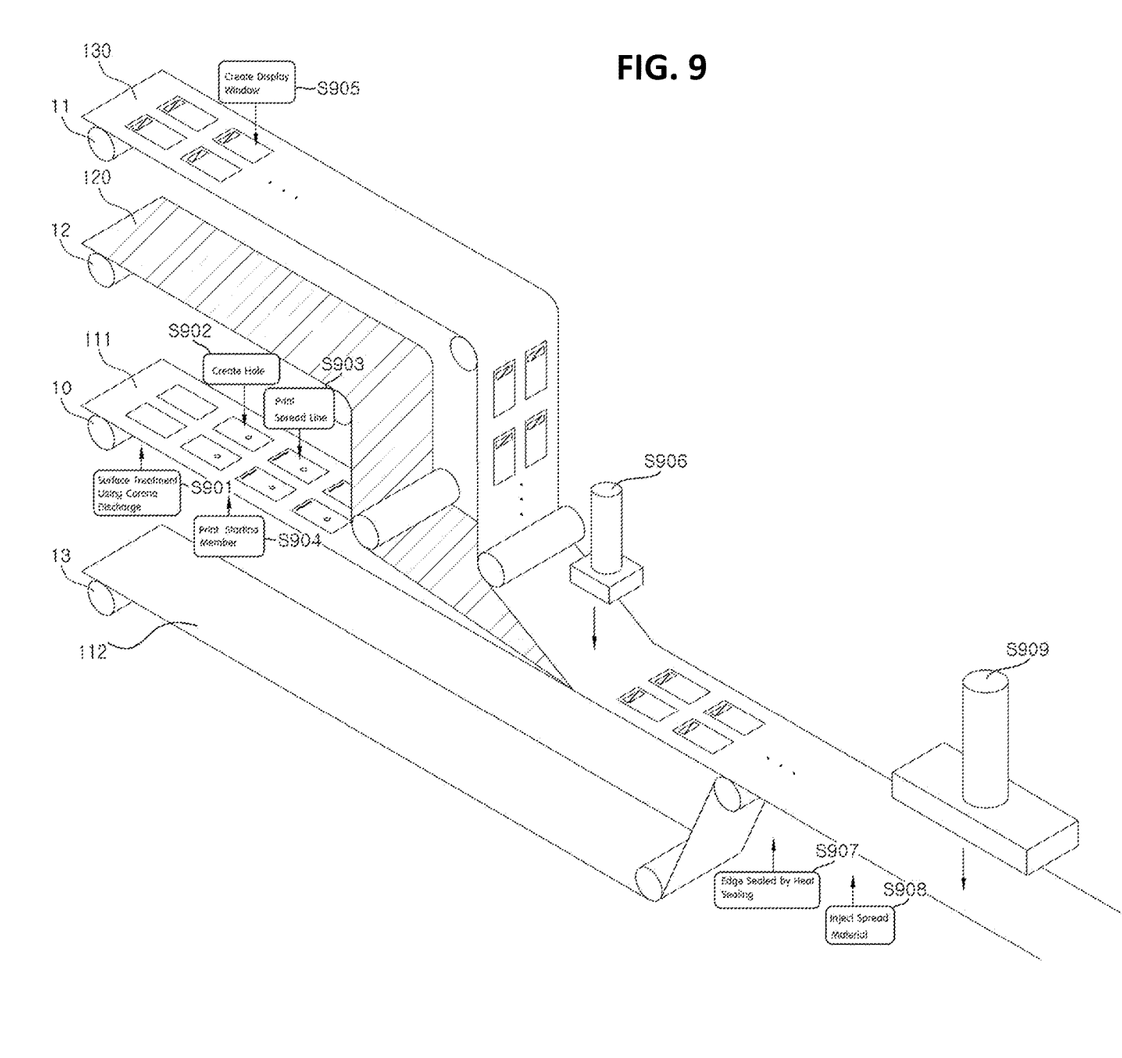
FIG. 9 is an exemplary drawing illustrating the manufacturing method of the time-temperature indicating module (100) in sequential order, according to an exemplary embodiment of the present invention.

FIG. 9 shows the manufacturing process of the time-temperature indicating module (100) according to an exemplary embodiment of the present invention.

FIG. 9 is an exemplary drawing illustrating, in sequential order, the manufacturing method of the time-temperature indicating module (100) according to an exemplary embodiment of the present invention.

First, the bottom surface of the first spread materials interposed layer (111), provided via the first conveyor (10), is applied with a surface treatment using a corona discharge to strengthen the adhesiveness of the starting member (140) (S901).

Then, the hole (111c) is created (S902) on the first spread materials interposed layer (111) and one or more spread lines (111d) are printed (S903) on the top side of the first spread materials interposed layer (111).

Then, the starting member (140) and the protective member (141) are adhesively printed on the bottom surface of the first spread materials interposed layer (111) so that they can cover (S904) the hole (111c).

With the exception of the display window (131) on the indicating layer (130), which is supplied via the second conveyor (11), the rest of the area is then printed opaquely so that the display window (130) can be created (S905). The spread medium layer (120), which is supplied via the third conveyor (12), is interposed between the first spread materials interposed layer (111) and the indicating layer (130); they are then laminated together via heat sealing or bonding (S906).

Then the edge of the top side of the second spread materials interposed layer (112), supplied via the conveyor (13), and the edge of the bottom surface of the first spread materials interposed layer (111) which was laminated at step S906 previously, are sealed by heat sealing to make a sealed section (S907).

Then the spread material (1) is injected into the first and the second spread materials interposed layers (111, 112) (S908). The unsealed section of the first and the second spread materials interposed layers (111, 112) is sealed by heat sealing in the shape of the time-temperature indicating module (100) so that the spread material (1) within is completely sealed. After the heat sealing, the sealed section is cooled down to strengthen it, after which superfluous sealed areas that are not a part of the time-temperature indicating module (100) are cut away (S909).

It is important to note that FIG. 9 does not depict the only possible sequence of the manufacturing process of the time-temperature indicating module (100); the order can easily be changed.

As described above, since the starting member in an exemplary embodiment of the present invention can have optimal bursting value through a proper mixture of crystalline compound powders and ink resins, it is easy for the user of the product to create a crack to initiate the dispersion of the spreading material. Furthermore, laminating strengthens the sealing between the first and the second spread materials interposed layers, which prevents the spread material from leaking or flowing out.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A time-temperature indicating module comprising:
a spread materials interposing layer, where the spread material melts when the temperature changes;
a spread medium layer provided above the spread materials interposing layer and absorbs the spread material to allow it to disperse;
an indicating layer provided above the spread medium layer, which enables a user to see from an exterior of the indicating layer whether the spread medium is spread or not; and
a starting member provided on an inside of the spread materials interposing layer, which enables the spread material and spread medium layer to come into contact via a crack generated by external pressure,
wherein the spread materials interposing layer comprises:
a first interposed layer where a hole is formed;

a second interposed layer laminated along an edge of a bottom surface of the first interposed layer; and a section containing the spread material, which is provided between the first and the second interposed layers and filled with the spread material, and having a feature where the spread material flows through the hole into the spread medium layer.

2. The time-temperature indicating module of claim 1, wherein each of the first and the second spread materials are made of a laminated spread material interposing film, which is at least one of the following materials: polyethylene terephthalate (PET), polypropylene (PP), polyethylene (PE), and nylon (NY) and wherein the spread material interposing film provided on the lowest side and the spread material interposing film provided on the top side is made of heat sealable materials.

3. The time-temperature indicating module of claim 1, wherein a surface treatment is applied to the bottom surface of the first interposed layer, using a corona discharge that is higher than a specific dyne level.

4. The time-temperature indicating module of claim 1, wherein the starting member is bonded in line with the hole in the bottom surface of the first interposed layer in order to cover the hole, and wherein, when external pressure is applied, the spread material flows into the spread medium thorough the crack generated in the hole, to initiate contacting of the spread material with the spread medium.

5. The time-temperature indicating module of claim 1, wherein the starting member is a type of synthetic resin, which may include a crystalline compound that at minimum contains either a calcium carbonate powder or titanium dioxide.

6. The time-temperature indicating module of claim 1, further comprises protective member printed to cover the exterior of the starting member.

7. The time-temperature indicating module of claim 1, wherein the spread medium layer is a type of micro-porous film.

8. The time-temperature indicating module of claim 1, wherein the indicating layer is be made of a laminated synthetic resin film, which is at least one of the following materials:

polyethylene terephthalate (PET), polypropylene (PP), polyethylene (PE), and nylon (NY).

9. The time-temperature indicating module of claim 1, wherein the spread materials interposing layer is laminated further with an anti-leakage film that prevents the spread material from flowing out via the bottom of the spread materials interposing layer.

10. The time-temperature indicating module of claim 1, wherein one or more spread lines are printed on a side of the first interposed layer to indicate how much spread material is dispersed along the layer.

11. The time-temperature indicating module of claim 10, wherein the indicating layer comprises a display window located in line with the spread line and one or more spread lines may gradually penetrate into the display window with the dispersion of the spread material, becoming visible from the exterior.

12. The time-temperature indicating module of claim 11, wherein the display window is a transparent area and the other sections excluding the display window is an opaque printing area.

* * * * *